United States Patent
Sumiya et al.

(10) Patent No.: US 10,358,106 B2
(45) Date of Patent: Jul. 23, 2019

(54) AIRBAG APPARATUS

(71) Applicant: Autoliv Development AB, Vårgårda (SE)

(72) Inventors: Tomohiro Sumiya, Yokohama (JP); Kai Maenishi, Yokohama (JP); Yutaka Nakajima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 1 day.

(21) Appl. No.: 15/501,126

(22) PCT Filed: Jul. 15, 2015

(86) PCT No.: PCT/JP2015/070229
§ 371 (c)(1),
(2) Date: Feb. 1, 2017

(87) PCT Pub. No.: WO2016/021381
PCT Pub. Date: Feb. 11, 2016

(65) Prior Publication Data
US 2017/0217397 A1    Aug. 3, 2017

(30) Foreign Application Priority Data
Aug. 4, 2014  (JP) .................................. 2014-158892

(51) Int. Cl.
*B60R 21/233*  (2006.01)
*B60R 21/00*  (2006.01)
(Continued)

(52) U.S. Cl.
CPC ........ *B60R 21/205* (2013.01); *B60R 21/2165* (2013.01); *B60R 21/233* (2013.01);
(Continued)

(58) Field of Classification Search
CPC combination set(s) only.
See application file for complete search history.

(56) References Cited

U.S. PATENT DOCUMENTS

| 4,262,931 A | 4/1981 | Strasser et al. |
| 6,612,611 B1 * | 9/2003 | Swann .................... B60R 21/21 280/729 |

(Continued)

FOREIGN PATENT DOCUMENTS

| CA | 1 160 657 | 1/1984 |
| CA | 2 584 099 | 10/2007 |

(Continued)

OTHER PUBLICATIONS

PCT International Search Report—dated Oct. 6, 2015.

*Primary Examiner* — Nicole T Verley
(74) *Attorney, Agent, or Firm* — Brinks Gilson & Lione (57) ABSTRACT

An airbag device capable of restraining a motor vehicle occupant in a stable position even in an oblique collision. The airbag device includes a bag-shaped main bag inflated and deployed on a vehicle front side of the passenger seat, a bag-shaped center bag inflated and deployed on the inner side of the main bag in the vehicle widthwise direction, and a slit that provides a separation between the main bag and the center bag on the vehicle rear side. A rear end part of the center bag is inclined to gradually protrude rearward in the vehicle as the rear end part is extended upward and protrudes further to the vehicle rear side than at least the main bag.

15 Claims, 8 Drawing Sheets

(51) Int. Cl.
  *B60R 21/205* (2011.01)
  *B60R 21/2338* (2011.01)
  *B60R 21/2165* (2011.01)
  *B60R 21/239* (2006.01)
  *B60R 21/231* (2011.01)

(52) U.S. Cl.
  CPC ........ *B60R 21/239* (2013.01); *B60R 21/2338* (2013.01); *B60R 2021/0004* (2013.01); *B60R 2021/0032* (2013.01); *B60R 2021/23107* (2013.01); *B60R 2021/23386* (2013.01)

(56) References Cited

U.S. PATENT DOCUMENTS

| | | | | |
|---|---|---|---|---|
| 7,048,301 | B2* | 5/2006 | Walsh | B60R 21/23184 280/730.2 |
| 7,152,880 | B1 | 12/2006 | Pang et al. | |
| 7,360,790 | B2* | 4/2008 | Hasebe | B60R 21/233 280/743.2 |
| 7,506,892 | B2* | 3/2009 | Klinkenberger | B60R 21/233 280/743.2 |
| 7,766,385 | B2* | 8/2010 | Fukawatase | B60R 21/233 280/743.2 |
| 8,020,888 | B2* | 9/2011 | Cheal | B60R 21/213 280/729 |
| 8,256,798 | B2* | 9/2012 | Yamazaki | B60R 21/231 280/732 |
| 8,579,321 | B2* | 11/2013 | Lee | B60R 21/214 280/729 |
| 8,720,941 | B1* | 5/2014 | Svensson | B60R 21/233 280/730.2 |
| 8,851,510 | B1* | 10/2014 | Dinsdale | B60R 21/23138 280/730.2 |
| 8,882,138 | B1* | 11/2014 | Hicken | B60R 21/231 280/730.1 |
| 8,882,139 | B2* | 11/2014 | Kawamura | B60R 21/213 280/730.2 |
| 8,967,660 | B2* | 3/2015 | Taguchi | B60R 21/233 280/729 |
| 9,108,588 | B2* | 8/2015 | Fukawatase | B60R 21/233 |
| 9,126,558 | B2* | 9/2015 | Kawamura | B60R 21/213 |
| 9,139,154 | B2* | 9/2015 | Abramoski | B60R 21/232 |
| 9,187,055 | B1* | 11/2015 | Genthikatti | B60R 21/2338 |
| 9,227,587 | B1* | 1/2016 | Belwafa | B60R 21/205 |
| 9,248,799 | B2* | 2/2016 | Schneider | B60R 21/205 |
| 9,340,176 | B2* | 5/2016 | Belwafa | B60R 21/233 |
| 9,358,945 | B2* | 6/2016 | Yamada | B60R 21/233 |
| 9,421,935 | B2* | 8/2016 | Fukawatase | B60R 21/205 |
| 9,434,344 | B2* | 9/2016 | Fukawatase | B60R 21/2338 |
| 9,440,610 | B2* | 9/2016 | Lee | B60R 21/232 |
| 9,446,735 | B1* | 9/2016 | Jayasuriya | B60R 21/232 |
| 9,463,763 | B2* | 10/2016 | Watamori | B60R 21/23138 |
| 9,469,269 | B2* | 10/2016 | Hiruta | B60R 21/232 |
| 9,505,372 | B2* | 11/2016 | Yamada | B60R 21/2338 |
| 9,522,648 | B2* | 12/2016 | Fukawatase | B60R 21/233 |
| 9,550,469 | B2* | 1/2017 | Sato | B60R 21/231 |
| 9,555,762 | B2* | 1/2017 | Umehara | B60R 21/233 |
| 9,566,929 | B1* | 2/2017 | Belwafa | B60R 21/205 |
| 9,623,831 | B1* | 4/2017 | Deng | B60R 21/239 |
| 9,650,011 | B1* | 5/2017 | Belwafa | B60R 21/233 |
| 9,738,243 | B2* | 8/2017 | Fukawatase | B60R 21/233 |
| 9,758,121 | B2* | 9/2017 | Paxton | B60R 21/205 |
| 9,758,123 | B2* | 9/2017 | Yamada | B60R 21/235 |
| 9,914,423 | B2* | 3/2018 | Kim | B60R 21/232 |
| 2002/0135164 | A1 | 9/2002 | Thomas | |
| 2003/0115945 | A1 | 6/2003 | Abe | |
| 2003/0218325 | A1 | 11/2003 | Hasebe et al. | |
| 2004/0051285 | A1 | 3/2004 | Fischer | |
| 2005/0029779 | A1 | 2/2005 | Bito et al. | |
| 2005/0184489 | A1* | 8/2005 | Kobayashi | B60R 21/231 280/729 |
| 2005/0230945 | A1 | 10/2005 | Watanabe | |
| 2006/0163848 | A1* | 7/2006 | Abe | B60R 21/231 280/729 |
| 2006/0186656 | A1* | 8/2006 | Kumagai | B60R 21/231 280/743.2 |
| 2008/0023943 | A1* | 1/2008 | Kwon | B60R 21/233 280/728.2 |
| 2010/0090445 | A1 | 4/2010 | Williams et al. | |
| 2010/0264630 | A1* | 10/2010 | Walston | B60R 21/213 280/730.2 |
| 2013/0001934 | A1 | 1/2013 | Nagasawa et al. | |
| 2014/0217709 | A1* | 8/2014 | Fukawatase | B60R 21/232 280/730.2 |
| 2014/0361521 | A1 | 12/2014 | Fukawatase | |
| 2015/0115581 | A1* | 4/2015 | Mazanek | B60R 21/232 280/730.2 |
| 2015/0166002 | A1* | 6/2015 | Fukawatase | B60R 21/233 280/730.1 |
| 2015/0367802 | A1* | 12/2015 | Fukawatase | B60R 21/205 280/732 |
| 2016/0159311 | A1* | 6/2016 | Yamada | B60R 21/233 280/729 |
| 2016/0207490 | A1* | 7/2016 | Yamada | B60R 21/2338 |
| 2017/0015270 | A1* | 1/2017 | Ohno | B60R 21/233 |
| 2017/0028955 | A1* | 2/2017 | Ohno | B60R 21/207 |
| 2017/0036639 | A1* | 2/2017 | Yamada | B60R 21/205 |
| 2017/0088087 | A1* | 3/2017 | Williams | B60R 21/2338 |
| 2017/0136981 | A1* | 5/2017 | Fukawatase | B60R 21/233 |
| 2017/0291565 | A1* | 10/2017 | Yamamoto | B60R 21/207 |
| 2018/0015902 | A1* | 1/2018 | Maenishi | B60R 21/233 |
| 2018/0050654 | A1* | 2/2018 | Spahn | B60R 21/205 |
| 2018/0056920 | A1* | 3/2018 | Paxton | B60R 21/233 |

FOREIGN PATENT DOCUMENTS

| | | | |
|---|---|---|---|
| CN | 1459394 A | 12/2003 | |
| CN | 1824548 A | 8/2006 | |
| CN | 1951732 A | 4/2007 | |
| CN | 200985009 Y | 12/2007 | |
| CN | 200985010 Y | 12/2007 | |
| CN | 102849017 A | 6/2011 | |
| CN | 102186702 A1 | 9/2011 | |
| DE | 602 04 277 T2 | 11/2005 | |
| DE | 10 2007 032 763 A1 | 1/2008 | |
| DE | 10 2012 018 450 A1 | 3/2014 | |
| DE | 102012023928 A1 * | 6/2014 | B60R 21/36 |
| EP | 1 364 838 A2 | 5/2003 | |
| EP | 1 398 228 A2 | 3/2004 | |
| EP | 1 498 320 A2 | 1/2005 | |
| EP | 1 775 176 A1 | 4/2007 | |
| EP | 1 775 177 A1 | 4/2007 | |
| EP | 1 842 742 A2 | 10/2007 | |
| EP | 1 693 256 B1 | 8/2008 | |
| EP | 2 799 292 A1 | 11/2014 | |
| GB | 2550481 A * | 11/2017 | |
| JP | 56-67649 | 6/1981 | |
| JP | 3-329656 | 2/1991 | |
| JP | 4-55141 | 2/1992 | |
| JP | 5-65706 | 8/1993 | |
| JP | 6-72276 | 3/1994 | |
| JP | 6-80057 | 3/1994 | |
| JP | 8-72261 | 3/1996 | |
| JP | 8-268204 | 10/1996 | |
| JP | 10-71920 | 3/1998 | |
| JP | 2000-280845 | 10/2000 | |
| JP | 2003-182500 | 7/2003 | |
| JP | 2003-335203 | 11/2003 | |
| JP | 2004-262432 | 9/2004 | |
| JP | 2005-88681 | 4/2005 | |
| JP | 2005-247118 | 9/2005 | |
| JP | 2006-88856 | 4/2006 | |
| JP | 2006-256508 | 9/2006 | |
| JP | 2006-327505 | 12/2006 | |
| JP | 2007-112427 | 5/2007 | |
| JP | 2007-112430 | 5/2007 | |
| JP | 2007-216733 | 8/2007 | |
| JP | 2007-276771 | 10/2007 | |
| JP | 2008-44594 | 2/2008 | |
| JP | 2008-114615 | 5/2008 | |
| JP | 2008-179173 | 8/2008 | |
| JP | 2009-227180 | 3/2009 | |

(56) References Cited

FOREIGN PATENT DOCUMENTS

| | | | |
|---|---|---|---|
| JP | 2009-120114 | 6/2009 | |
| JP | 2010-201980 | 9/2010 | |
| JP | 2012-56371 | 3/2012 | |
| JP | 2012-505783 | 3/2012 | |
| JP | 2013-14176 | 1/2013 | |
| JP | 2013-35473 | 2/2013 | |
| JP | 2013-112276 | 6/2013 | |
| JP | WO 2013/099036 A1 | 7/2013 | |
| JP | 5408268 B2 * | 2/2014 | ........... B60R 21/205 |
| JP | 5491332 B2 * | 5/2014 | |
| JP | 2014-121965 | 7/2014 | |
| JP | 6156187 B2 * | 7/2017 | |
| JP | 6179388 B2 * | 8/2017 | |
| JP | 6197756 B2 * | 9/2017 | |
| JP | 6233198 B2 * | 11/2017 | |
| JP | 6256261 B2 * | 1/2018 | |
| KR | 2007-0042093 | 4/2007 | |
| KR | 2007-0052192 | 5/2007 | |
| KR | 2011-0071076 | 6/2011 | |
| MX | 2007003946 A | 11/2008 | |
| WO | WO 2010/045040 A1 | 10/2009 | |
| WO | WO-2016147732 A1 * | 9/2016 | ........... B60R 21/205 |

* cited by examiner

VIEW ON ARROW A

AIRBAG APPARATUS

CROSS REFERENCE TO RELATED APPLICATIONS

This application claims priority to Japanese Patent Application No. 2014-158892, filed on Aug. 4, 2014 and PCT/JP2015/070229, filed on Jul. 15, 2015.

FIELD OF THE INVENTION

The present invention relates to an airbag device for a front passenger seat, the device being configured to restrain an occupant in a front passenger seat of a vehicle from a vehicle front side.

BACKGROUND

In recent years, airbag devices have become standard equipment for most passenger car motor vehicles. The airbag device is a safety device activated in response to an emergency event such as a vehicle collision and inflated and deployed by gas pressure for receiving and protecting an occupant. There are different kinds of airbag devices for various installation locations or uses. For example, a front driver side airbag is provided in the center of the steering at the driver seat in order to protect the occupant in the front seat against an impact occurring mainly in the front-back direction, and a passenger airbag is provided near a front passenger seat at the instrument panel or any of other locations. In addition, a curtain airbag that is inflated and deployed along the side windows is provided at the wall part near the roof in order to protect occupants in the front and back seats against a side collision and a subsequent roll over (turn over), and a side airbag that is inflated and deployed just beside an occupant is provided at a side of the seat.

The airbag device disclosed in Japanese Patent Application Publication No. H06-80057 is adaptable to a vehicle having three front seats. In that disclosure, a third airbag unit configured to restrain the occupant in a center seat is inflated and deployed in addition to a first airbag unit configured to restrain the occupant in a driver's seat, a second airbag unit configured to restrain the occupant in a front passenger seat. The third airbag unit is provided in the vicinity of a ceiling sun visor and configured to be inflated and deployed in the downward direction toward between the occupant in the center seat and the instrument panel.

Presently, there has been a demand for airbag devices configured to cope with irregular collisions and impacts including a so-called oblique collision in which impacts occur on a vehicle in a direction obliquely from the front or the back of the vehicle. In an oblique collision, an occupant may move into an airbag cushion (hereinafter simply as "a cushion") present in front of the seat in an irregular behavior such as movement in an oblique direction. In the airbag configuration disclosed in previously identified background reference for example, the occupant in the front passenger seat may contact the third airbag unit present in the front on the inner side in the vehicle-widthwise direction (hereinafter simply as "the vehicle inner side"). However, it would be difficult to provide sufficient occupant restraining force and reducing injury values related to the occupant simply by providing an additional cushion obliquely in front of the occupant.

In view of the problem, it is an object of the present invention to provide an airbag device capable of restraining an occupant in a stable position in an oblique collision and reducing injury values related to the occupant.

SUMMARY AND INTRODUCTORY DESCRIPTION OF THE INVENTION

In order to solve the problem, in an exemplary configuration of an airbag device according to the present invention, the airbag device restrains an occupant in a vehicle and includes a bag-shaped main bag inflated and deployed on a vehicle front side of a seat and a bag-shaped center bag inflated and deployed on an inner side of the main bag in a vehicle widthwise direction, the center bag has a rear end part that is inclined to gradually protrude to a vehicle rear side as the rear end part is extended upward and protrudes further to the vehicle rear side than at least the main bag.

As described above, in an oblique collision, the occupant in a passenger seat may move obliquely forward on the vehicle inner side. In the case, as the head of the occupant contacts a conventional main bag present in front of the passenger seat, the head may turn clockwise around the neck as an axis as viewed from above.

Therefore, according to the present invention, the rear end part of the center bag provided on the vehicle inner side of the main bag is provided to protrude further to the vehicle rear side than the main bag. In this configuration, the head of the occupant moving obliquely forward on the vehicle inner side contacts the center bag mainly from the side head part at the same time or immediately before or after the head contacts the main bag in the front. The head of the occupant is restrained in a vicinity between the main bag and the center bag while the side head part is in contact with the center bag. In this configuration, the clockwise rotation of the head of the occupant can be reduced or prevented. In particular, the angular velocity of the rotation of the head can be reduced, so that the injury value associated with the rotation can be reduced.

Furthermore, according to the present invention, the rear end part of the center bag is inclined to gradually protrude to the vehicle rear side from a lower position to a higher position. In the configuration, the rear end part of the center bag can restrain the side head part of the occupant from the vehicle inner side by the side surface in the higher position as described above and can restrain the shoulder of the occupant on the vehicle inner side from the front and from above in the lower position. The occupant in a passenger seat is normally restrained by a seat belt from the shoulder on the vehicle outer side to the flank on the vehicle inner side. In the meantime, the shoulder on the vehicle inner side is not restrained by the seat belt. Therefore, in an oblique collision, the occupant may move obliquely forward while projecting the shoulder on the vehicle inner side ahead such that the upper half of the body is twisted. However, according to the present invention, the rear end part of the center bag inclined to gradually protrude to the vehicle rear side as the rear end part is extended upward restrains the shoulder of the occupant from the front and from above. Therefore, according to the present invention, the rotation of the head as described above can be restrained while the twisting of the upper half of the body of the occupant can be cancelled, so that the occupant can be restrained in an optimum manner.

The rear end part of the center bag may be inclined along a straight line as viewed from a side of the vehicle. The center bag in the configuration can restrain the side head part of the occupant by the side surface on the vehicle outer side and can restrain the shoulder of the occupant from the front and from above by the rear end part.

The rear end part of the center bag may be inclined along a curve that protrudes to the vehicle rear side or is depressed to the vehicle front side as viewed from a side of the vehicle. Also in this configuration, a center bag capable of restraining the side head and the shoulder of the occupant can be provided.

The rear end part of the main bag may be gradually inclined to the vehicle front side as the rear end part is extended upward. In a vehicle collision, the occupant often contacts the main bag positioned in front of the seat. The head of the occupant is more likely to have a higher injury value for a load in the backward bending direction (the direction in which the occupant lifts the head). Therefore, in the configuration, the rear end part of the main bag is inclined to the vehicle front side in the upward direction, so that the load in the backward bending direction of the head can be reduced. In this way, an airbag device having reduced injury values associated with the occupant can be provided.

The airbag device may further include a slit that provides a separation between the main bag and the center bag on the vehicle rear side. In the configuration, the head of the occupant upon contacting the center bag is guided into the slit and restrained while the side head part is in contact with the center bag. In this way, the rotation of the head of the occupant can be more efficiently reduced or cancelled.

The main bag and the center bag may be integrated under the slit. The slit may be provided in a location that can be contacted by the head of the occupant. In a location under the slit, the chest of the occupant for example may be restrained in an optimum manner by integrating the main bag and the center bag.

The airbag device may further include a band-shaped tether belt connected to a first connecting part on an upper part of the center bag on the vehicle rear side and a second connecting part on an upper part of the main bag, and the tether belt may have a length by which the tether belt is strained when the main bag and the center bag are inflated and deployed and the first connecting part and the second connecting part move away from each other.

In the configuration, the center bag is supported at the main bag by the tether belt. Therefore, when the head of the occupant contacts the center bag from the vehicle outer side, the center bag can be prevented from moving toward the main bag on the vehicle inner side, and the narrowness of the slit can be kept, so that the head of the occupant can be guided to the slit and restrained in an optimum manner.

The second connecting part may be provided in a location on the upper part of the man bag on the inner side in the vehicle widthwise direction. In the configuration, the tether belt has a shorter length than the case in which the second connecting part is on the vehicle outer side of the main bag. In this way, reaction force to be applied to the head of the occupant through the center bag may be changed by changing the length of the tether belt.

The second connecting part may be provided further on the vehicle front side than the first connecting part. In the configuration, the center bag can efficiently restrain the side head part of the occupant without losing the positional balance when the occupant contacts the center bag from the vehicle outer side.

When inflated and deployed, the main bag may be in contact with a windshield of the vehicle and an upper surface part of an instrument panel of the vehicle. More specifically, the main bag may be inflated and deployed while being sandwiched between the windshield and the instrument panel. In the configuration, the position of the main bag can be stabilized when the occupant comes thereto, which also stabilizes the position of the center bag connected to the main bag by the tether belt.

The airbag device may further include a box-shaped housing provided inside the upper surface part of the instrument panel of the vehicle to store the main bag and the center bag, and the main bag and the center bag may tear open the upper surface part of the instrument panel to be inflated and deployed. In this configuration, an airbag device for a passenger seat with high occupant restraining performance can be provided in an optimum manner.

According to the present invention, an airbag device capable of restraining an occupant in a stable position in an oblique collision and reducing injury values related to the occupant can be provided.

BRIEF DESCRIPTION OF DRAWINGS

FIGS. 2(a-c) are views illustrating a cushion in an inflated and deployed state in FIG. 1(b) as viewed in various directions;

FIGS. 3(a-c) are views illustrating the process of restraining an occupant by the cushion in FIG. 2(c);

FIGS. 5(a-c) are views illustrating the process of restraining the occupant by the cushion in FIG. 3 as viewed from above;

FIGS. 6(a-c) are views illustrating the process of restraining the occupant by the cushion in FIG. 3 as viewed from the vehicle front side;

DETAILED DESCRIPTION

Preferred embodiments of the present invention will be described in detail in conjunction with the accompanying drawings. The sizes, materials, and other specific numerical values and the like in the following description of the embodiments are simply by way of examples for easier understanding of the present invention and should not be construed to limit the present invention unless otherwise specified. Note that in the description and the drawings, components having substantially the same functions and configurations are designated by the same reference characters, their description are not repeated, and components not directly relevant to the present invention are not shown.

Figure 1A:
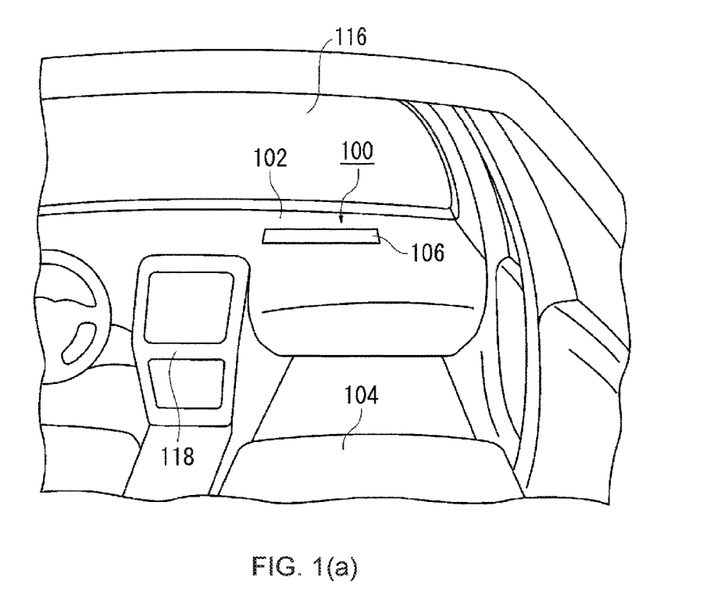
FIGS. 1(a) and (b) are views illustrating a general configuration of an airbag device according to an embodiment of the present invention.
Figure 1B:
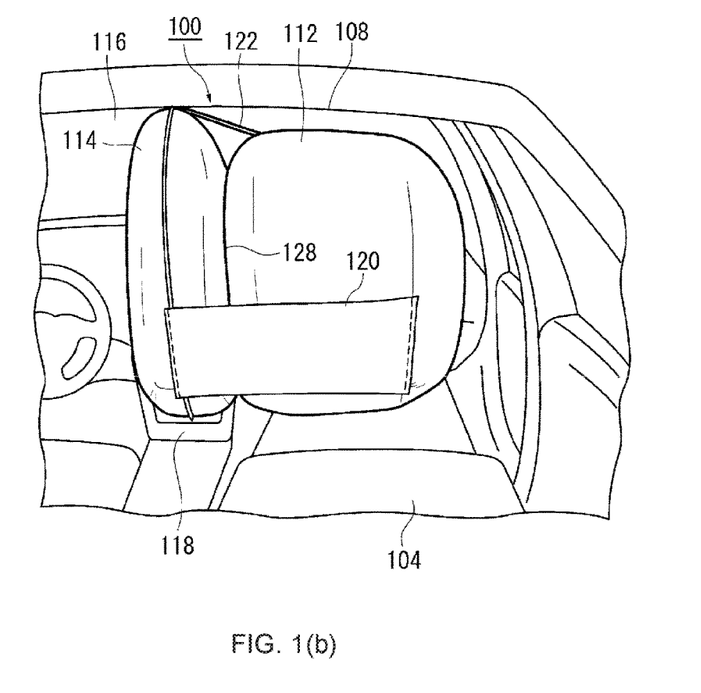

FIGS. 1(a) and (b) are views illustrating a general configuration of an airbag device 100 according to an embodiment of the present invention. FIG. 1(a) is a view illustrating a vehicle before the airbag device 100 is activated. The airbag device 100 according to the embodiment embodies as an example a device for a passenger seat (front right passenger seat) in a left-hand drive vehicle. Note that the technical idea of the embodiment applies suitably not only to the airbag device for the passenger seat but also to an airbag device for other kinds of seats in a vehicle. The airbag device 100 is provided inside an upper surface part 106 of an instrument panel 102 on the side of a passenger seat 104. In response to an impact detection signal received from a sensor that is not shown, the airbag device 100 causes a cushion 108 (see FIG. 1(b)) to tear open the upper surface part 106 and to be inflated and deployed rearward in the vehicle. FIG. 1(b) is a view illustrating the vehicle after the airbag device 100 is activated. The cushion 108 of the airbag device 100 restrains an occupant 132 (see FIG. 3(a)) of the passenger seat 104 from the front side in the vehicle. The cushion 108 has a bag shape and is inflated and deployed by gas supplied from an inflator 110 (see FIG. 3(a)). The cushion 108 has its surface formed for example by sewing or adhering together pieces of ground fabric placed on each other or by weaving by an one-piece woven (OPW) technique.

The cushion 108 of the airbag device 100 includes two parts, a main bag 112 and a center bag 114. The main bag 112 is a part with a larger capacity and inflated and deployed in front of the passenger seat 104. The main bag 112 is inflated and deployed so as to fill the space between the occupant 132 of the passenger seat 104 and the instrument panel 102 and the windshield 116. This prevents the occupant 132 from hitting the instrument panel 102. The occupant 132 can be prevented from hitting the windshield 116, which also prevents the occupant 132 from being thrown from the vehicle.

The center bag 114 is a flat part with a smaller volumetric capacity than the main bag 112 and inflated and deployed on the vehicle inner side of the main bag 112. The center bag 114 is inflated and deployed in front of a center console 118 as viewed from the occupant 132 (see FIG. 3(a)) and restricts the occupant 132 from moving to the vehicle inner side or hitting the center console 118 for example in an oblique collision. The main bag 112 and the lower part of the center bag 114 are connected and integrated by a tie panel 120 made of fabric.

Figure 2A:
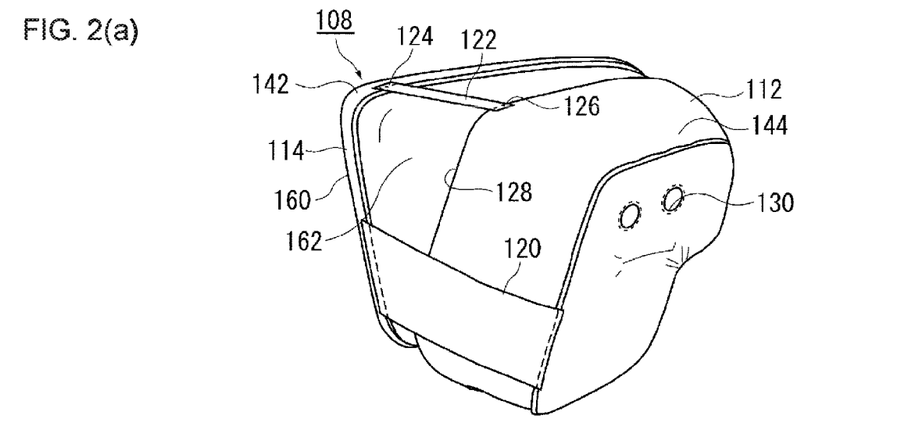

FIGS. 2(a-c) are views illustrating the cushion 108 in an inflated and deployed state in FIG. 1(b) as viewed in different directions. FIG. 2(a) is a perspective view illustrating the cushion 108 in FIG. 1(b) as viewed from above on the vehicle outer side. A slit 128 is formed between the center bag 114 and the main bag 112. The slit 128 provides a separation between the center bag 114 and the main bag 112 on the rear side in the vehicle. The slit 128 is a region adapted to restrain the head E1 of the occupant 132 in particular (see FIG. 3(a)). The center bag 114 has its upper part 142 connected to the main bag 112 by a tether belt 122 so that the center bag is not separated from the main bag 112. The tether belt 122 and the tie panel 120 are positioned to exclude locations which can be contacted by the head E1 of the occupant 132 and expose the slit 128.

Two vent holes 130 are provided on a side surface of the main bag 112 on the vehicle outer side. The vent holes 130 are so-called exhaust holes adapted to externally discharge gas supplied from the inflator 110 (see FIG. 3(a)). Since, for example, only the side window is present on the vehicle outer side of the main bag 112 and the occupant 132 (see FIG. 3(a)) is not present, the presence of the vent holes 130 on the side surface of the main bag 112 on the vehicle outer side is effective.

Figure 2B:
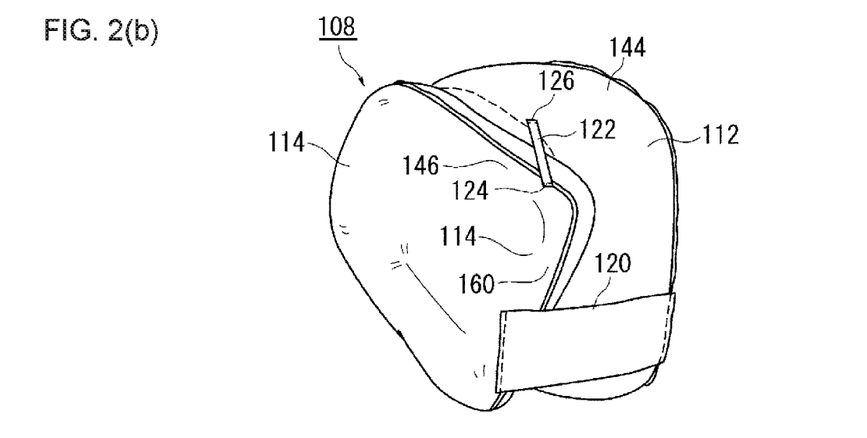

FIG. 2(b) is a perspective view illustrating the cushion 108 in FIG. 2(a) as viewed from above on the vehicle inner side. As illustrated in FIG. 2(b), the tether belt 122 connects an upper part 142 of the center bag 114 and an upper part 144 of the main bag 112. The tether belt 122 is band-shaped and functions to support the position of the center bag 114. The tether belt 122 is for example made of the same kind of base fabric as the cushion 108 and connected to a first connecting part 124 on the center bag 114 and a second connecting part 126 on the main bag 112 by sewing.

Figure 2C:
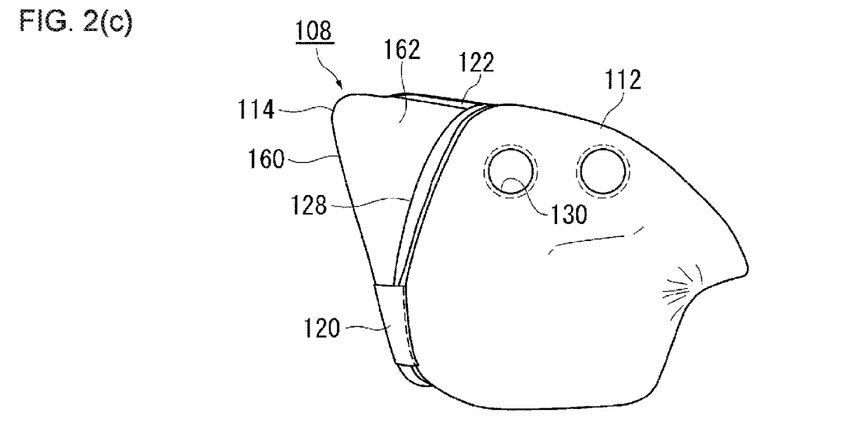

FIG. 2(c) is a view illustrating the cushion 108 in FIG. 2(b) as viewed from the vehicle outer side. As illustrated in FIG. 2(c), the center bag 114 according to the embodiment has its rear end part 160 on the vehicle rear side protrude behind the main bag 112 (leftward in FIG. 2(c)) while being inflated and deployed. Therefore, a side surface 162 of the center bag 114 on the vehicle outer side is exposed through the slit 128. The center bag 114 is configured to mainly restrain the side head part E1a of the occupant 132 (see FIG. 3(a)) by the side surface. The center bag 114 is supported at the main bag 112 by the tether belt 122 and can therefore function as a reaction force surface used to restrain the side head part E1a.

The rear end part 160 of the center bag 114 is inclined along a straight line so as to gradually protrude to the vehicle rear side as the rear end part is extended upward. The rear end part 160 mainly restrains the left shoulder E3a of the occupant 132 (FIG. 3(b)) on the vehicle inner side from the vehicle front side and supports, together with the main bag 112, the upper half of the body of the occupant 132.

Figure 3A:
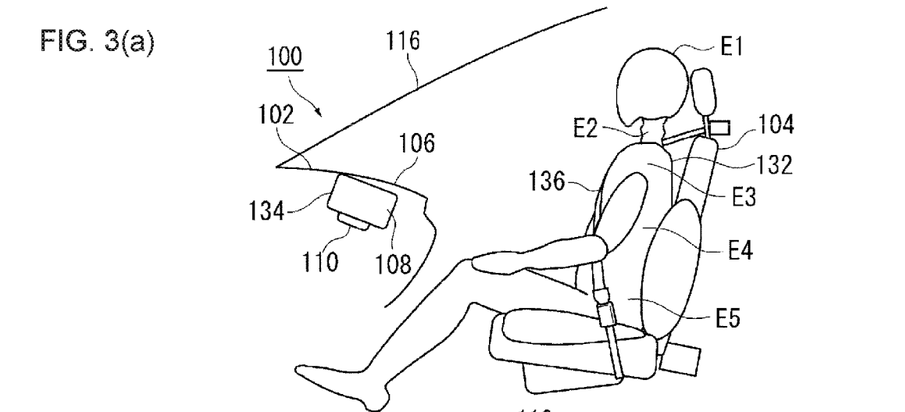
Figure 3B:
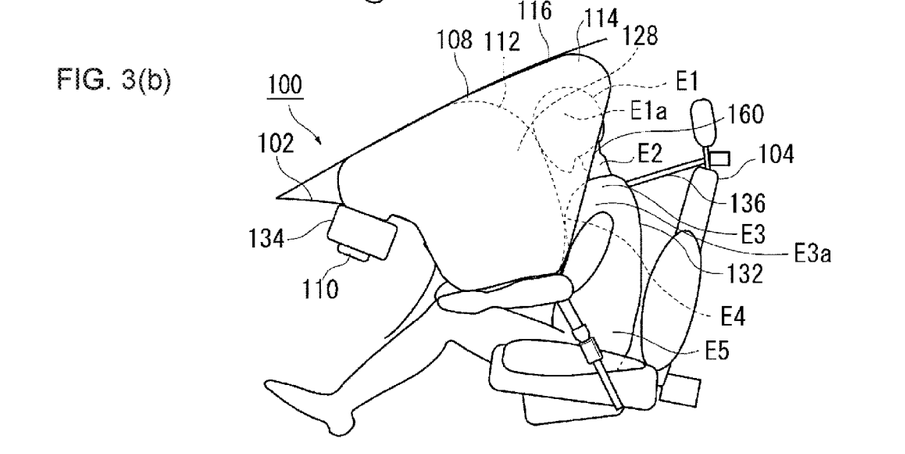
Figure 3C:
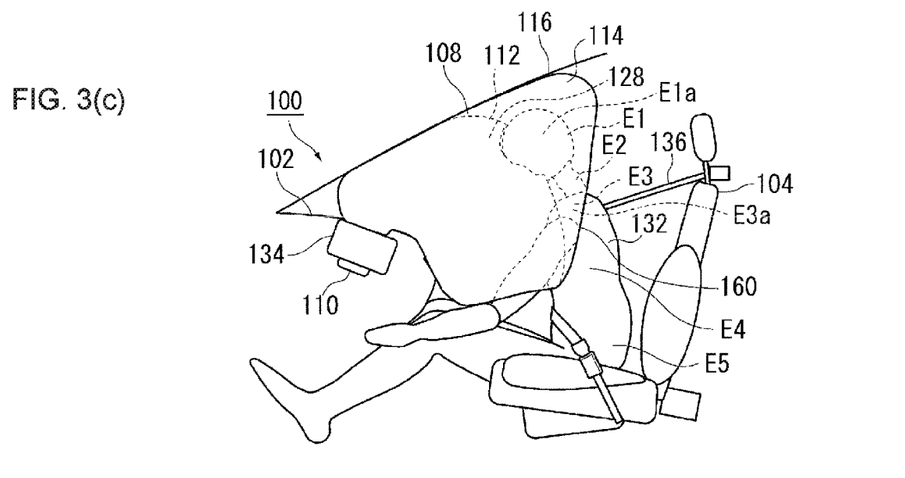

FIGS. 3(a-c) are views illustrating the process of restraining the occupant 132 by the cushion 108 in FIG. 2(c). In each of FIGS. 3(a-c), the left in the figures corresponds to the vehicle front side. FIG. 3(a) is a view illustrating a state in which the cushion 108 is not yet deployed. As illustrated in FIG. 3(a), the main bag 112 and the center bag 114 included in the cushion 108 are both stored in a housing 134. The housing 134 is for example in a box shape having an upper side opened and stores the cushion 108 in a folded state.

The inflator 110 is provided at the bottom of the housing 134. An example of the inflator 110 may include a disk-shaped type but a cylindrical (cylinder) type may also be used. Various types of inflators are available today and examples of the inflators may include an inflator filled with a gas generating agent to generate gas by burning the gas generating agent, an inflator filled with compressed gas to supply the gas without generating heat, and a hybrid type inflator configured to use both combustion gas and compressed gas. The inflator 110 may be of any type.

In response to an impact detection signal from a sensor that is not shown, the airbag device 100 causes the cushion 108 to receive gas from the inflator 110 and start to be inflated. FIG. 3(b) is a view illustrating the cushion 108 in an inflated and deployed state. The cushion 108 tears open the upper surface part 106 of the instrument panel 102 that functions as a lid for the housing 134 and is inflated and deployed rearward in the vehicle. The main bag 112 and the center bag 114 of the cushion 108 are communicated for example by an internal vent hole that is not shown and inflated and deployed by the common inflator 110. However, the internal vent hole is not always necessary. The main bag 112 and the center bag 114 may be formed, for instance, as bags independent from each other and use separate inflators.

The occupant 132 illustrated in FIG. 3(b) is further on the side of the cushion 108 than the occupant 132 in FIG. 3(a). In response to an emergency event such as a vehicle collision, the occupant 132 moves forward in the vehicle by means of inertia. When the occupant 132 wears a seat belt 136 and the hip E5 is restrained, the upper half of the body of the occupant 132 moves along a path around the hip E5 as a center such that the occupant bends forward.

Figure 4:
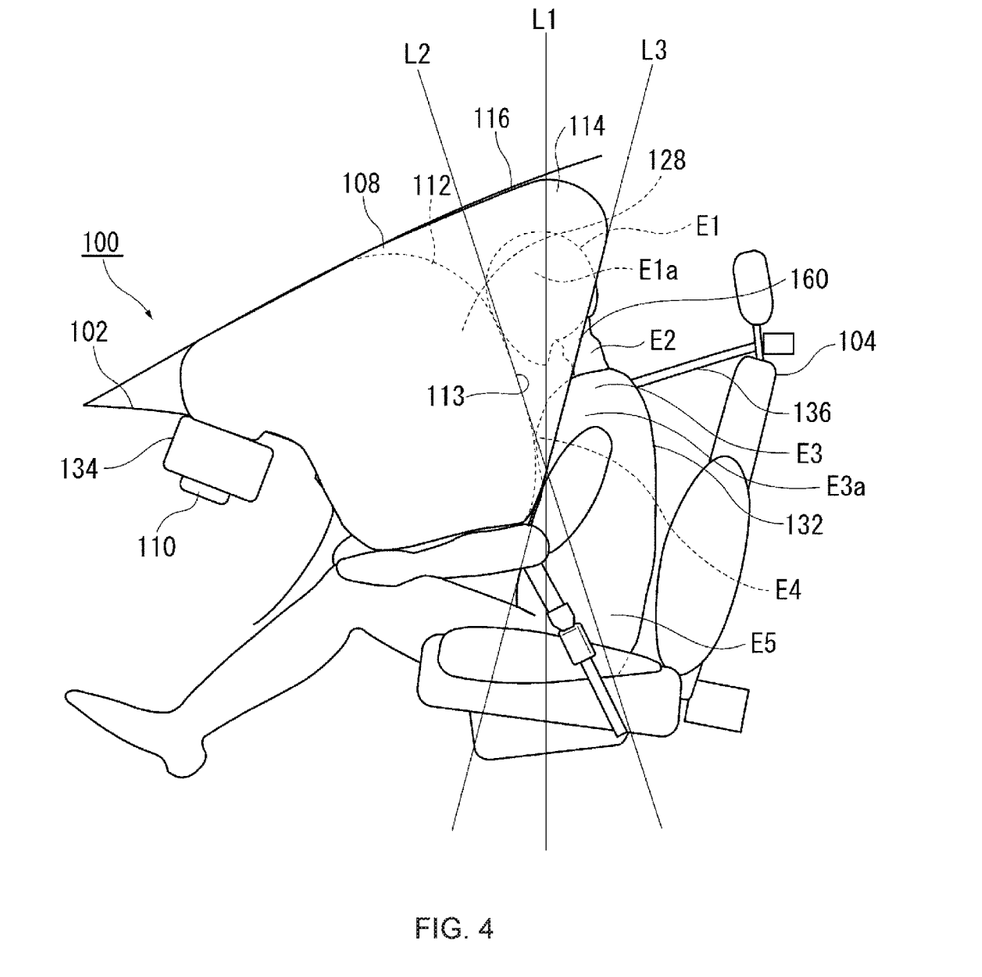
FIG. 4 is an enlarged view of the cushion and the occupant in FIG. 3(b).

FIG. 4 is an enlarged view of the cushion 108 and the occupant 132 in FIG. 3(b). As illustrated in FIG. 4, the rear end part 113 of the main bag 112 is inclined to the vehicle front side as viewed in the vehicle widthwise direction. More specifically, a virtual line L2 obtained by virtually extending the rear end part 113 of the main bag 112 is inclined to the vehicle front side with respect to the vertical line L1 as the virtual line is extended upward. The main bag 112 is positioned in front of the passenger seat 104 and mainly contacted by the head E1, the shoulder E3, and the chest E4 of the occupant 132 and restrains these parts for example in most emergency cases including a vehicle collision. Among the body parts of the occupant 132, the head E1 in particular is more likely to have a higher injury value for a load in the backward bending direction (the direction in which the occupant lifts the head). Therefore, according to the embodiment, the rear end part 113 of the main bag 112 is inclined to the vehicle front side in the upward direction, so that the load in the backward bending direction of the head E1 and an associated injury value are reduced.

The inflated and deployed main bag 112 is in contact with the windshield 116 and the upper surface part 106 of the instrument panel 102. The main bag 112 is inflated and deployed while being sandwiched between the windshield 116 and the instrument panel 102, so that the main bag can surely restrain the occupant 132 in a stable position when the occupant 132 comes thereinto.

The center bag 114 protrudes behind the main bag 112 (rightward in FIG. 3(b)) in the vehicle. According to the embodiment, the rear end part 160 of the center bag 114 is inclined to the vehicle rear side as viewed in the widthwise direction. More specifically, a virtual line L3 obtained by extending the rear end part 160 of the center bag 114 is inclined to the vehicle rear side with respect to the vertical line L1 as the virtual line is extended upward.

The rear end part 160 of the center bag 114 restrains the left shoulder E3a of the occupant 132. The occupant 132 is restrained by the seat belt 136 from the right shoulder E3b on the vehicle outer side to the flank on the vehicle inner side while the left shoulder E3a is not restrained by the seat belt 136. Therefore, in an oblique collision, the occupant may move forward in the vehicle while projecting the left shoulder E3a ahead such that the upper half of the body is twisted. In such a behavior, the occupant 132 contacts the center bag 114 from the side head part E1a, the rear end part 160 of the inclined center bag 114 restrains the left shoulder E3a from the front and from above, and the main bag 112 restrains the right shoulder E3b. In this way, according to the embodiment, the angular velocity of the rotation of the head E1 can be reduced, and the twisting of the upper half of the body can be cancelled, so that the injury values related the occupant 132 can be further reduced.

FIG. 3(c) is a view illustrating a state in which the occupant 132 is further on the side of the cushion 108 than the state in FIG. 3(b). As illustrated in FIG. 3(c), the head E1 of the occupant 132 is guided into the slit 128 and restrained by the airbag 112 and 114 in the region of the slit 128 while the side head part E1a is in contact with the center bag 114. The left shoulder E3a of the occupant 132 is restrained from the front by the rear end part 160 of the center bag 114. In this way, the twisting of the upper half of the body is cancelled.

Figure 5A:
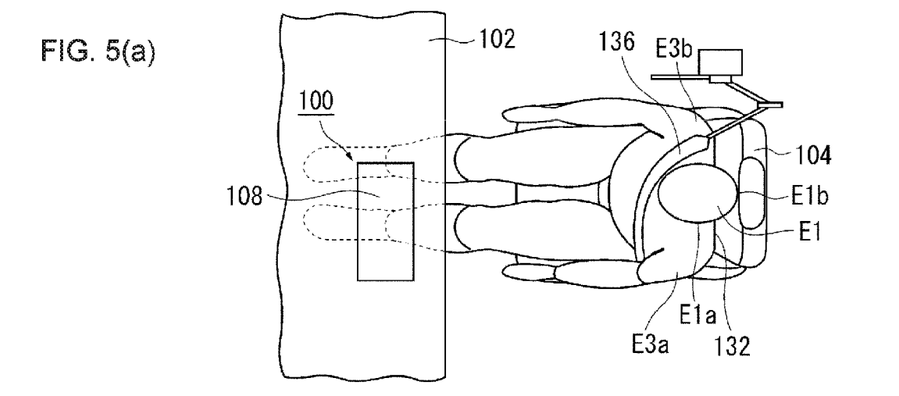
Figure 5B:
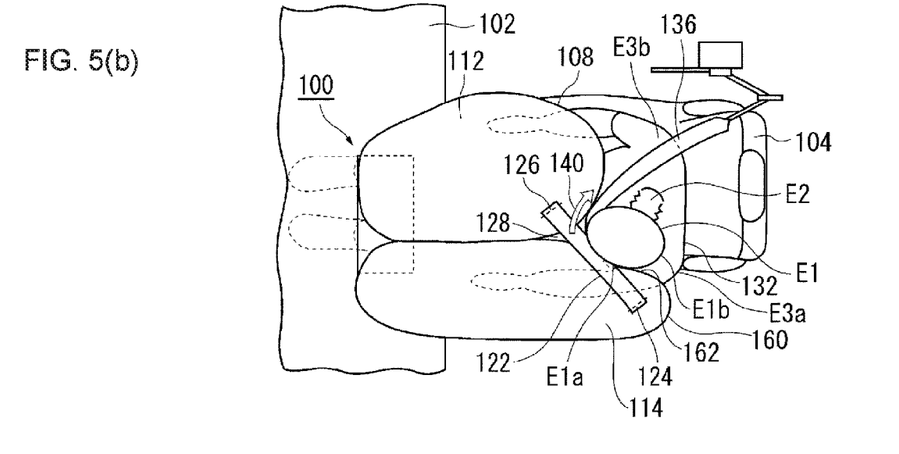
Figure 5C:
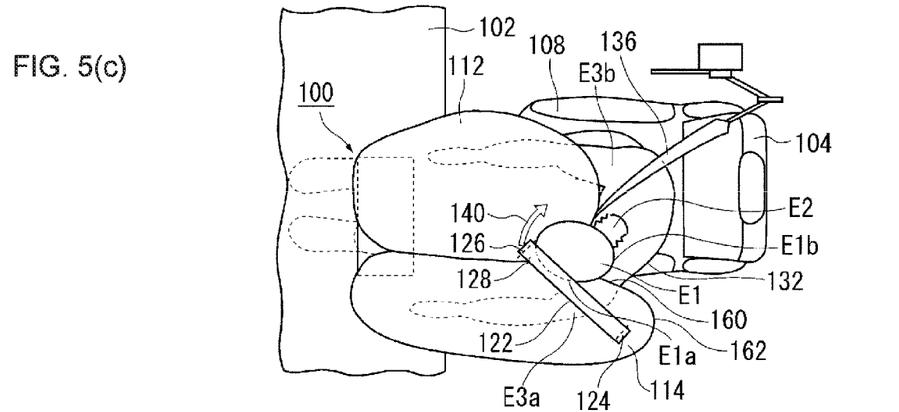

FIGS. 5(a-c) are views illustrating the process of restraining the occupant 132 by the cushion 108 in FIG. 3 as viewed from above. FIGS. 5(a-c) correspond to FIGS. 3(a-c), respectively. Now, referring to FIGS. 5(a-c), the process of restraining the occupant 132 by the cushion 108 will be described.

As illustrated in FIG. 5(a), it is assumed that the occupant 132 is seated at the passenger seat 104 wearing the seat belt 136. When a collision against the vehicle occurs in this state, an activation signal is transmitted to the airbag device 100 from a sensor that is not shown, and the cushion 108 is inflated and deployed as in FIG. 5(b). In an oblique collision, the occupant 132 moves obliquely forward on the vehicle inner side. According to the embodiment, the center bag 114 protrudes behind the main bag 112 in the vehicle, and the head E1 of the occupant 132 contacts the side surface 162 of the center bag 114 on the vehicle outer side from the side head part E1a.

FIG. 5(c) is a view illustrating a state in which the occupant 132 moves further toward the cushion 108 than the state in FIG. 5(b). When the head E1 of the occupant 132 moving obliquely forward contacts the main bag 112 in front of the passenger seat 104, clockwise rotation force (rotation 140 indicated by the arrow) may be generated at the head E1 around the neck E2 as an axis when viewed from above. Then, according to the embodiment, the main bag 112 is provided with the center bag 114 protruding behind the main bag 112 on the vehicle inner side, and the slit 128 is provided between the main bag 112 and the center bag 114.

In the configuration, the head E1 of the occupant 132 moving obliquely forward on the vehicle inner side is restrained as the head comes into the slit 128 while the side head part E1a is in contact with the center bag 114. In particular, according to the embodiment, the center bag 114 actively restrains the area from the side head part E1a to the rear head part E1b, and the rotation 140 generated at the head E1 can be reduced or cancelled. In the configuration, the angular velocity of the rotation 140 of the head E1 of the occupant 132 can be reduced, so that the injury value of the head E1 caused by the rotation 140 can be reduced.

The rear end part 160 of the center bag 114 restrains the left shoulder E3a of the occupant 132. The left shoulder E3a of the occupant 132 is not restrained by the seat belt 136, and therefore in an oblique collision, the occupant may move forward in the vehicle while projecting the left shoulder E3a ahead such that the upper half of the body is twisted. In this way, the rear end part 160 of the center bag 114 restrains the left shoulder E3a from the front and from above, and then the right shoulder E3b is restrained by the main bag 112. In this way, according to the embodiment, the angular velocity of the rotation of the head E1 can be reduced, and the twisting of the upper half of the body can be reduced, so that the injury values related the occupant 132 can be even more reduced.

As described in connection with FIG. 3(b), the main bag 112 is inflated in a stable position while being sandwiched between the instrument panel 102 and the windshield 116. The center bag 114 is supported at the main bag 112 through the tether belt 122, so that the separation of the center bag 114 from the main bag 112 is restrained.

The first connecting part 124 of the tether belt 122 is provided at the upper part 142 of the center bag 114 on the vehicle rear side. The second connecting part 126 of the tether belt 122 is provided in a location of the upper part 144 of the main bag 112 on the vehicle inner side and further on the vehicle front side than the first connecting part 124. The center bag 114 has its upper part on the rear side pulled forward on the vehicle outer side by the tether belt 122 and can efficiently restrain the head E1 in a stable position.

The tether belt 122 has such a length that the tether belt is strained when the main bag 112 and the center bag 114 are inflated and deployed and the first connecting part 124 and the second connecting part 126 move apart from each other. When the heavy head E1 contacts the center bag 114 from the vehicle outer side, the center bag 114 is not much separated from the main bag 112 because of the presence of the strained tether belt 122, and the narrowness of the slit 128 can be kept, so that the center bag 114 can restrain the head E1 of the occupant 132.

Note that the position of the second connecting part 126 can be changed as appropriate. The second connecting part 126 may be provided for example at a center part in the vehicle-widthwise direction or a part on the vehicle outer side on the upper part 144 of the main bag 112. According to the embodiment, the second connecting part 126 is provided at the part of the main bag 112 on the vehicle inner side, and the length of the tether belt 122 as a whole is shorter than the case of providing the second connecting part 126 for example at the part of the main bag 112 on the vehicle outer side, which allows the tether belt 122 to be easily strained. In this way, the length of the tether belt 122 can be changed by changing the position of the second connecting part 126, and for example the tension of the tether belt 122 or reaction force to be applied to the head E1 of the occupant 132 through the center bag 114 may be changed as appropriate.

As described in connection with FIG. 5(b), the contact between the occupant 132 and the cushion 108 is initiated as the side head part E1a contacts the center bag 114. However, the contact between the occupant 132 and the cushion 108 may be in various manners, and for example the head E1 may contact both the center bag 114 and the main bag 112 at a time or the head E1 may contact the main bag 112 first. The shoulder E3 (see FIG. 3(b), etc.) and the chest E4 may contact the main bag 112 and the like first before the head E1 contacts the main bag 112 and the like. However, in any of the cases, in the configuration according to the embodiment described in conjunction with FIG. 6(b), the head E1 of the occupant 132 may be guided into the slit 128 and effectively restrained.

FIG. 5(b) illustrates the clockwise rotation 140 as an example of rotation generated at the head E1. However, for example, at the passenger seat in a right-hand drive vehicle, the head E1 may turn anti-clockwise around the neck as viewed from above. The cushion 108 according to the embodiment can cancel or reduce the anti-clockwise rotation using the slit 128, so that the angular velocity of the head E1 can be reduced. The airbag device 100 according to the embodiment can provide the same effect for both clockwise and anti-clockwise rotation generated at the head E1.

Figure 6A:
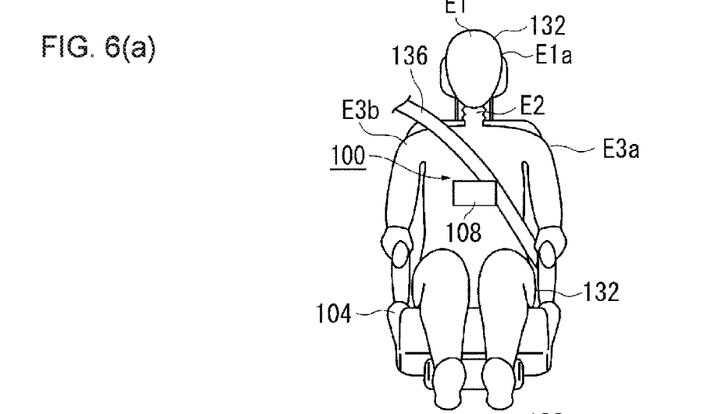
Figure 6B:
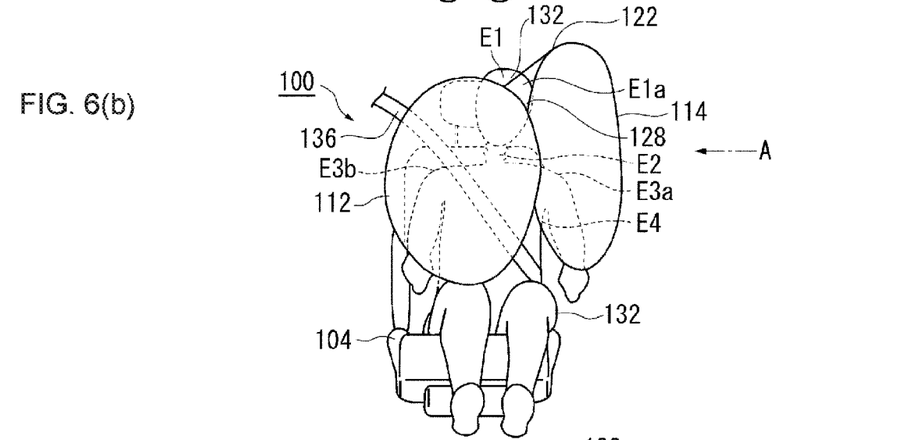
Figure 6C:
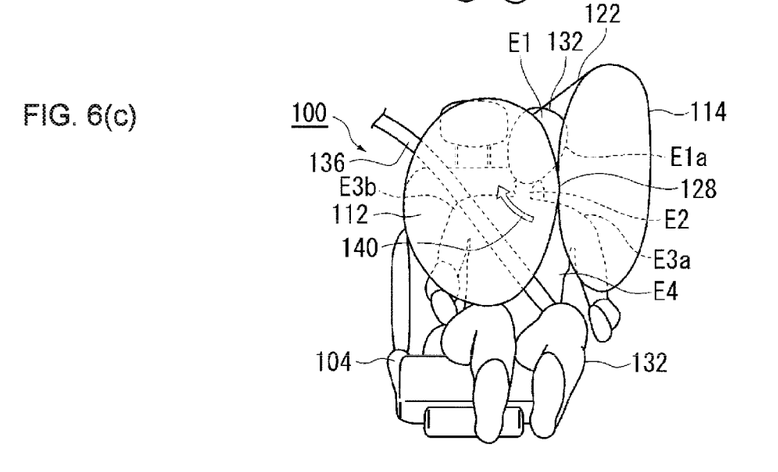

The process of restraining the occupant 132 by the cushion 108 will be described in view of a different direction. FIGS. 6(a-c) are views illustrating the process of restraining the occupant 132 by the cushion 108 in FIGS. 3(a-c) as viewed from the vehicle front side. As illustrated in FIG. 6(a), it is assumed that the occupant 132 of the passenger seat 104 is seated wearing the seat belt 136. If a collision against the vehicle occurs in this state, the main bag 112 is inflated and deployed in front of the occupant 132 as in FIG. 6(b), and the center bag 114 is inflated and deployed in front of the occupant 132 on the vehicle inner side (rightward in FIG. 6(b)).

As illustrated in FIG. 6(b), the occupant 132 moves obliquely forward on the vehicle inner side from the seating location and contacts the center bag 114 by the side head part E1a. In addition, the left shoulder E3a not restrained by the seat belt 136 is restrained by the rear end part 160 of the center bag 114 (see FIG. 3(b)). As illustrated in FIG. 6(c), the head E1 is guided by the center bag 114 to move forward in the vehicle and come into the slit 128 and is restrained by the slit 128.

Figure 7:
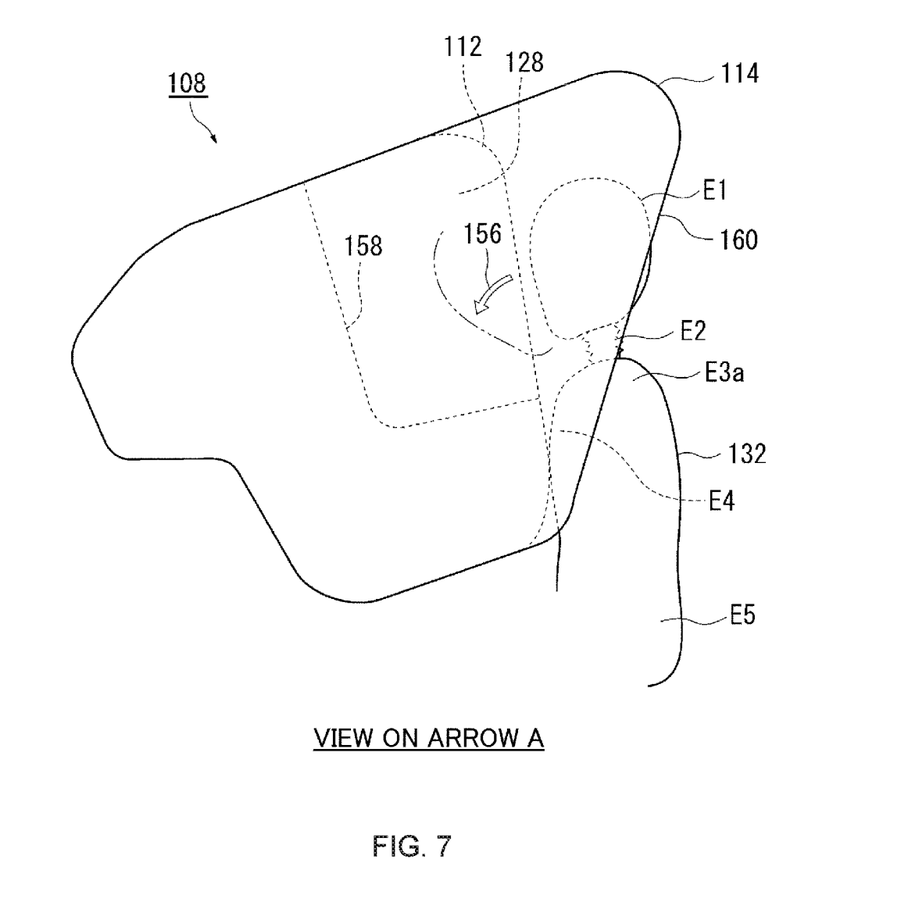
FIG. 7 is a schematic view of the cushion in FIG. 6(c) as viewed on the arrow A.

FIG. 7 is a schematic view of the cushion 108 in FIG. 6(c) on the arrow A. As illustrated in FIG. 7, the upper half of the body of the occupant 132 moves forward in the vehicle in a manner to rotate mainly around the hip E5 upon an impact against the vehicle. At the time, the head E1 of the occupant 132 moves forward in the vehicle as well as downward along a path 156 from the seating location. The depth of the slit 128 is set in consideration of the path 156 of the head E1 according to the embodiment.

FIG. 7 illustrates a connecting part 158 between the center bag 114 and the main bag 112. The connecting part 158 also forms the bottom of the slit 128 and determines the depth of the slit 128. The connecting part 158 is provided by sewing or forming the center bag 114 and the main bag 112 in a continuous shape. According to the embodiment, the slit 128 is provided so that the head E1 of the occupant 132 does not contact the connecting part 158. The connecting part 158 is provided to avoid the path 156 of the head E1 when for example the shoulder E3 of the occupant 132 is restrained by the center bag 114 or the main bag 112. In the configuration, the head E1 does not hit the connecting part 158, so that the cushion 108 can be provided more in a safety-conscious form.

The slit 128 is provided in a location that can be contacted by the head E1 of the occupant 132, and the main bag 112 and the center bag 114 are integrated under the slit 128. The part where the main bag 112 and the center bag 114 are integrated can restrain for example the shoulder E3 and the chest E4 of the occupant 132 in an optimum manner.

In the configuration described above, the center bag 114 can restrain the head E1 of the occupant 132, particularly the side head part E1a in an optimum manner. The center bag 114 restrains the head E1 of the occupant 132 as far as a slightly rear side part from the center of gravity of the head in the region from the side head part E1a to the rear head part E1b. The restraining process is completed when the slit 128 between the main bag 112 and the center bag 114 restrains the head E1. In addition, the rear end part 160 of the center bag 114 restrains the left shoulder E3a of the occupant 132 from the front and from above. In the configurations, the rotation 140 that may be generated at the head E1 of the occupant 132 and the twisting of the upper half of the body can be restrained, and the injury values related the occupant 132 can be reduced significantly.

Figure 8A:
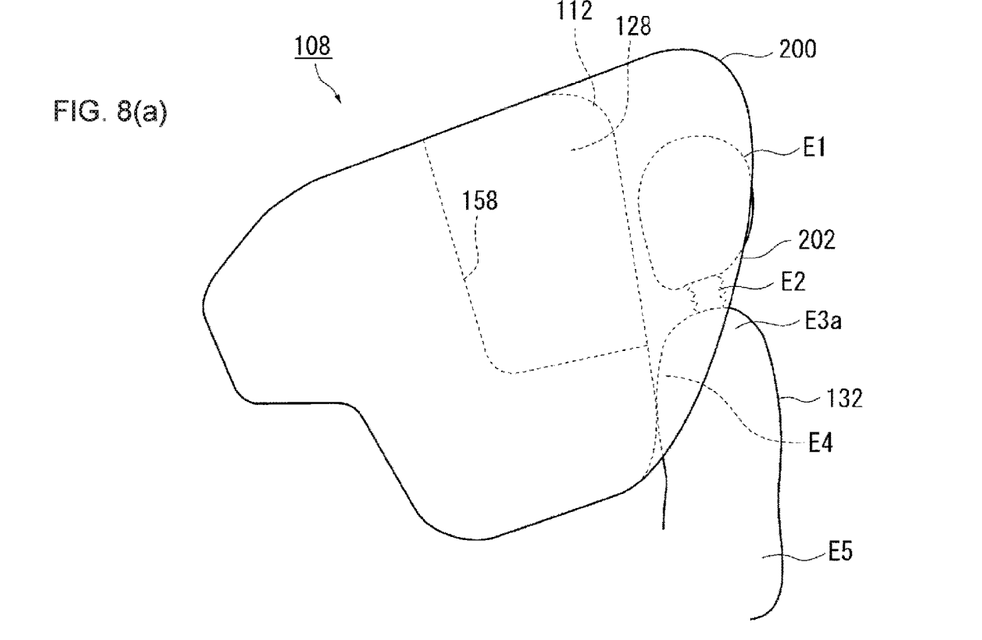
FIGS. 8(a) and (b) are views illustrating modifications of a center bag illustrated in FIG. 7.
Figure 8B:
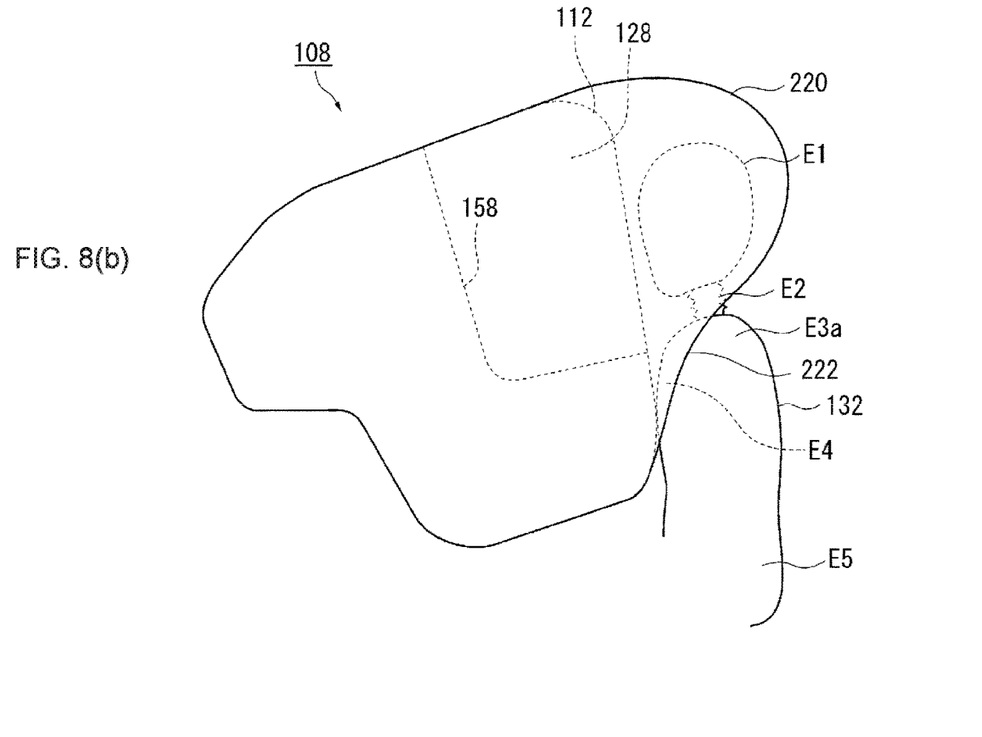

FIGS. 8(a) and (b) are views illustrating modifications of the center bag 114 illustrated in FIG. 7. Center bags 200 and 220 according to the modifications in FIGS. 8(a) and (b) have respective rear end parts 202 and 222 configured in different shapes from the center bag 114 in FIG. 7. Note that the same components as those already described above will be designated by the same reference characters, and their description will not be repeated.

The rear end part 202 of the center bag 200 according to a first modification in FIG. 8(a) is inclined along a curve protruding rearward in the vehicle (rightward in FIG. 8(a)) as viewed from a side of the vehicle. The curved rear end part 202 is more easily contacted by the left shoulder E3a of the occupant 132 for the curved protrusion and can restrain the left shoulder E3a in an optimum manner.

The rear end part 222 of the center bag 220 according to a second modification in FIG. 8(b) is inclined along a curve depressed forward in the vehicle (leftward in FIG. 8(b)). The rear end part 222 can contact the occupant 132 up to the upper part of the left shoulder E3a for the curved depression. Therefore, the rear end part 222 can restrain the left shoulder E3a in an optimum manner.

Alternatively, as a modification of the cushion 108, a main bag and a center bag may form independent bag shapes for example and may include respective housings and inflators. Alternatively, a main bag and a center bag independent from each other may include separate inflators and may be stored in the same housing. In each of the cushions in these configurations, the center bag may protrude behind the main bag in the vehicle and may be provided with a slit 128 and the like, so that the same function as that of the cushion 108 and the like described above can be achieved.

The preferred embodiments of the present invention have been described in conjunction with the accompanying drawings, while the described embodiments are simply preferred examples of the invention, and other embodiments may be carried out or achieved by various other methods. The present invention is not limited to the detailed shapes, sizes, configurations, positional arrangements and the like illustrated in the drawings unless otherwise specified particularly in the description of the invention. The wordings and terms in the description are simply by way of illustration and should not be construed as limitative unless otherwise specified particularly.

The present invention is applicable to an airbag device for a vehicle passenger seat, this device being configured to restrain the occupant in the passenger seat from the vehicle front side.

While the above description constitutes the preferred embodiment of the present invention, it will be appreciated that the invention is susceptible to modification, variation and change without departing from the proper scope and fair meaning of the accompanying claims.

The invention claimed is:

1. An airbag device for restraining an occupant in a vehicle, the airbag device comprising:
    a bag-shaped main bag configured to be inflated and deployed on a vehicle front side of a vehicle seat;
    a bag-shaped center bag configured to be inflated and deployed on an inner side of the main bag in a vehicle widthwise direction; and
    a connecting part formed between the main bag and the center bag on the inner side of the main bag,
    the center bag having a rear end part that is inclined to gradually protrude to a vehicle rear side as the rear end part is extended upward, the rear end part protruding further to the vehicle rear side than the main bag.

2. The airbag device according to claim 1, wherein the rear end part of the center bag is inclined along a straight line as viewed from a side of the vehicle.

3. The airbag device of claim 1, wherein the rear end part of the center bag is inclined along a curve that protrudes to the vehicle rear side or is depressed to the vehicle front side as viewed from a side of the vehicle.

4. The airbag device according to claim 1 wherein the rear end part of the main bag is gradually inclined to the vehicle front side as the rear end part is extended upward.

5. The airbag device according to claim 1, further comprising a slit that provides a separation between the main bag and the center bag on the vehicle rear side.

6. The airbag device according to claim 5, wherein the main bag and the center bag are integrated at the slit.

7. The airbag device according to claim 1 further comprising a band-shaped tether belt connected to a first connecting part on an upper part of the center bag on the vehicle rear side and a second connecting part on an upper part of the main bag, wherein
    the tether belt has a length such that the tether belt is strained when the main bag and the center bag are inflated and deployed and the first connecting part and the second connecting part move away from each other when the main bag and the center bag are inflated and deployed.

8. The airbag device according to claim 7, wherein the second connecting part is provided in a location on the upper part of the main bag on the inner side in the vehicle widthwise direction.

9. The airbag device according to claim 7, wherein the second connecting part is provided further on the vehicle front side than the first connecting part.

10. The airbag device according to claim 1, wherein the main bag is in contact with a windshield of the vehicle and an upper surface part of an instrument panel of the vehicle when the main bag is inflated and deployed.

11. The airbag device according to claim 1, further comprising a box-shaped housing provided inside an upper surface part of an instrument panel of the vehicle to store the main bag and the center bag, wherein
    the main bag and the center bag tear open the upper surface part of the instrument panel when the main bag and the center bag are inflated and deployed.

12. The airbag according to claim 5 further comprising the slit is formed by a connection between the main bag and the center bag.

13. An airbag device for restraining an occupant in a vehicle, the airbag device comprising:
    a bag-shaped main bag configured to be inflated and deployed on a vehicle front side of a vehicle seat;
    a bag-shaped center bag configured to be inflated and deployed on an inner side of the main bag in a vehicle widthwise direction;
    the center bag having a rear end part that is inclined to gradually protrude to a vehicle rear side as the rear end part is extended upward, the rear end part protruding further to the vehicle rear side than the main bag; and
    a band-shaped tether belt connected to a first connecting part on an upper part of the center bag on the vehicle rear side and a second connecting part on an upper part of the main bag,
    wherein the tether belt has a length such that the tether belt is strained when the main bag and the center bag are inflated and deployed, and the first connecting part and the second connecting part move away from each other when the main bag and the center bag are inflated and deployed.

14. The airbag device according to claim 13, wherein the second connecting part is provided in a location on the upper part of the main bag on the inner side in the vehicle widthwise direction.

15. The airbag device according to claim 13, wherein the second connecting part is provided further on the vehicle front side than the first connecting part.

* * * * *